(12) United States Patent
Pal et al.

(10) Patent No.: US 11,365,742 B2
(45) Date of Patent: Jun. 21, 2022

(54) THERMAL ENHANCEMENT OF CABIN AIR COMPRESSOR MOTOR COOLING

(71) Applicant: Hamilton Sundstrand Corporation, Charlotte, NC (US)

(72) Inventors: Debabrata Pal, Hoffman Estates, IL (US); Craig R. LeGros, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 912 days.

(21) Appl. No.: 14/976,898

(22) Filed: Dec. 21, 2015

(65) Prior Publication Data

US 2017/0175748 A1   Jun. 22, 2017

(51) Int. Cl.
  *F04D 25/08*   (2006.01)
  *F04D 29/58*   (2006.01)
  *F04D 17/10*   (2006.01)
  *B64D 13/06*   (2006.01)

(52) U.S. Cl.
  CPC .......... F04D 25/082 (2013.01); F04D 17/10 (2013.01); F04D 29/584 (2013.01); F04D 29/5806 (2013.01); *B64D 2013/0603* (2013.01)

(58) Field of Classification Search
  CPC .......... F04D 13/06; F04D 17/10; F04D 25/06; F04D 25/082; F04D 29/40; F04D 29/403; F04D 29/4206; F04D 29/4226; F04D 29/4246; F04D 29/44; F04D 29/441; F04D 29/5806; F04D 29/582; F04D 29/58; F04D 29/584; F04D 29/5846; F04B 17/02; F04B 35/04; F04B 39/06; F04B 39/064; F04B 39/066; F04B 39/12; F04B 39/121; F04B 39/123; F04B 53/08; F04B 53/16; F04C 15/06; F04C 15/008; F04C 15/0096; F04C 19/004; F04C 29/0085; F04C 29/04; F04C 29/042; F04C 29/047; F04C 29/12;
  (Continued)

(56) References Cited

U.S. PATENT DOCUMENTS 1,114,727 A * 10/1914 Breeze .................. F04D 25/082
188/264 R
2,301,063 A * 11/1942 McConaghy ....... F04D 13/0653
417/370

(Continued)

OTHER PUBLICATIONS

Extended European Search Report for EP Application No. 16205073.6; Report dated May 16, 2017 (7 pages).

*Primary Examiner* — Dominick L Plakkoottam
*Assistant Examiner* — Charles W Nichols
(74) *Attorney, Agent, or Firm* — Cantor Colburn LLP (57) ABSTRACT

A cabin air compressor assembly includes a cabin air compressor, and a cabin air compressor motor operably connected to the cabin air compressor. The cabin air compressor motor includes a rotor and a stator having a plurality of end windings. A cabin air compressor housing includes at least one cooling airflow hole formed therein. A motor cooling flow is movable across a portion of the cabin air compressor motor to cool the stator and the end windings. A duct extends from the cabin air compressor housing to an adjacent end winding such that a cooling outlet flow provided via the at least one cooling air flow hole is arranged in fluid communication with the end winding.

10 Claims, 6 Drawing Sheets

(58) Field of Classification Search
CPC ..... F04C 2250/10–102; F04C 2240/30; H02K 1/20; B64D 2013/0603
USPC .................................................. 417/366–371
See application file for complete search history.

(56) References Cited

U.S. PATENT DOCUMENTS

| | | | | |
|---|---|---|---|---|
| 2,722,616 A * | 11/1955 | Moses | ...................... | H02K 3/24 |
| | | | | 165/80.4 |
| 2,873,393 A * | 2/1959 | Baudryrenea | ............ | H02K 3/24 |
| | | | | 310/55 |
| 3,801,843 A * | 4/1974 | Corman | .............. | F28D 15/0275 |
| | | | | 165/104.25 |
| 4,268,772 A * | 5/1981 | Workman | ................ | H02K 1/26 |
| | | | | 310/197 |
| 5,331,238 A | 7/1994 | Johnsen | | |
| 6,009,722 A | 1/2000 | Choi et al. | | |
| 6,102,672 A * | 8/2000 | Woollenweber | .... | F04D 29/5806 |
| | | | | 417/366 |
| 6,288,460 B1 * | 9/2001 | Fakult | ...................... | H02K 3/24 |
| | | | | 310/179 |
| 7,181,928 B2 * | 2/2007 | de Larminat | ........... | F04D 25/06 |
| | | | | 62/505 |
| 7,439,702 B2 * | 10/2008 | Smith | ................... | F25B 31/006 |
| | | | | 318/701 |
| 7,575,421 B2 * | 8/2009 | McAuliffe | .............. | F04D 25/06 |
| | | | | 417/366 |
| 2004/0261428 A1 | 12/2004 | Murry | | |
| 2007/0271956 A1 | 11/2007 | Smith et al. | | |
| 2010/0013419 A1* | 1/2010 | White | ...................... | H02P 5/46 |
| | | | | 318/51 |
| 2010/0215526 A1 | 8/2010 | Saari | | |
| 2012/0011878 A1 | 1/2012 | Hipsky | | |
| 2012/0242176 A1 | 9/2012 | Pal | | |
| 2014/0030070 A1 | 1/2014 | Beers | | |
| 2014/0357176 A1 | 12/2014 | Beers | | |

* cited by examiner

THERMAL ENHANCEMENT OF CABIN AIR COMPRESSOR MOTOR COOLING

BACKGROUND OF THE INVENTION

Exemplary embodiments of this disclosure relates to aircraft environmental control systems, and more specifically, to cooling of a cabin air compressor motor for an environmental control system.

Environmental control systems (ECS) are utilized on various types of aircrafts for several purposes, such as in cooling systems for the aircraft. For example, components of the ECS may be utilized to remove heat from various aircraft lubrication and electrical systems and/or used to condition aircraft cabin air. A cabin air conditioner includes one or more cabin air compressors (CAC) which compress air entering the system, from an outside source or from a ram air system. The compressed air is delivered to an environmental control system to bring it to a desired temperature then delivered to the aircraft cabin. After passing through the cabin, a portion of the air is typically exhausted to the outside. The CACs are typically driven by air-cooled electric motors, which are cooled by a flow of cooling air typically drawn in by a ram air system.

The flow of cooling air and thus the performance of the electric motor and CAC is typically limited by the pressure drop from the CAC inlet to a downstream heat exchanger. Such a limitation may result in reduced performance of the CAC. In addition, air from the CAC may additionally leak into the motor cavity, which increases the pressure drop in cooling duct and resulting in significantly reduced cooling air flow and an increased motor temperature.

BRIEF DESCRIPTION OF THE INVENTION

According to one embodiment of the invention, a cabin air compressor assembly includes a cabin air compressor, and a cabin air compressor motor operably connected to the cabin air compressor. The cabin air compressor motor includes a rotor and a stator having a plurality of end windings. A cabin air compressor housing includes at least one cooling airflow hole formed therein. A motor cooling flow is movable across a portion of the cabin air compressor motor to cool the stator and the end windings. A duct extends from the cabin air compressor housing to an adjacent end winding such that a cooling outlet flow provided via the at least one cooling air flow hole is arranged in fluid communication with the end winding.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
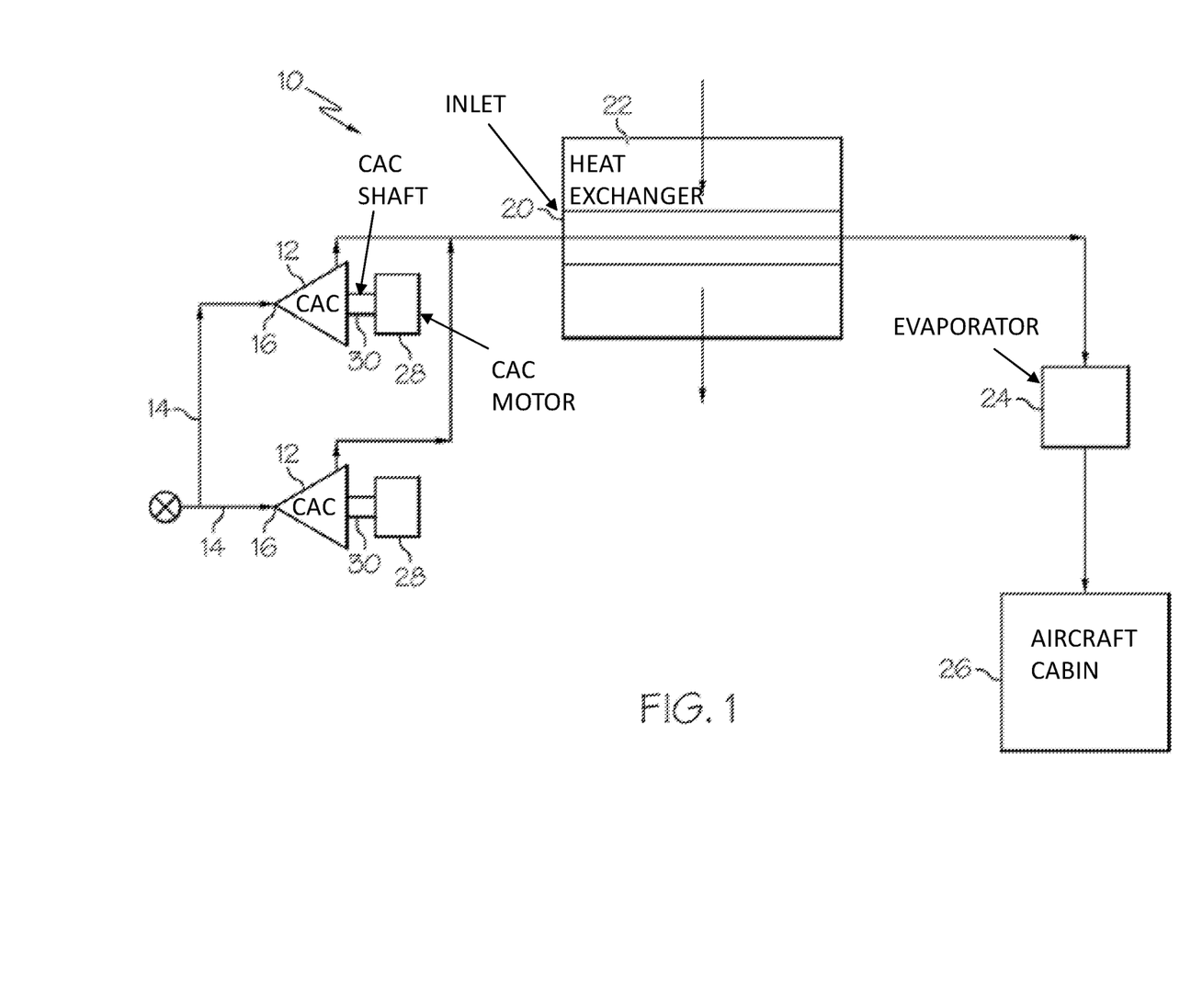
FIG. 1 is a schematic diagram of an environmental control system of an aircraft.

A schematic diagram illustrating a relevant portion of an environmental control system (ECS) 10 is shown in FIG. 1. The ECS 10 includes one or more cabin air compressors (CACs) 12, which in some embodiments are centrifugal compressors. An outside airflow, or air from another source, flows into the CAC 12 at a compressor inlet 16. The CAC 12 compresses the airflow 14 and urges the airflow 14 from the compressor inlet 16 to an inlet 20 of a heat exchanger 22. From the heat exchanger 22 the airflow 14 is provided to an evaporator 24 before being delivered to an aircraft cabin 26. Each CAC 12 is driven by a CAC motor 28 operably coupled to a corresponding CAC 12 via a CAC shaft 30. In one embodiment, the CAC motor 28 is a high powered motor configured to receive a power input of at least 100 kW, such as about 115 kW for example.

Figure 2:
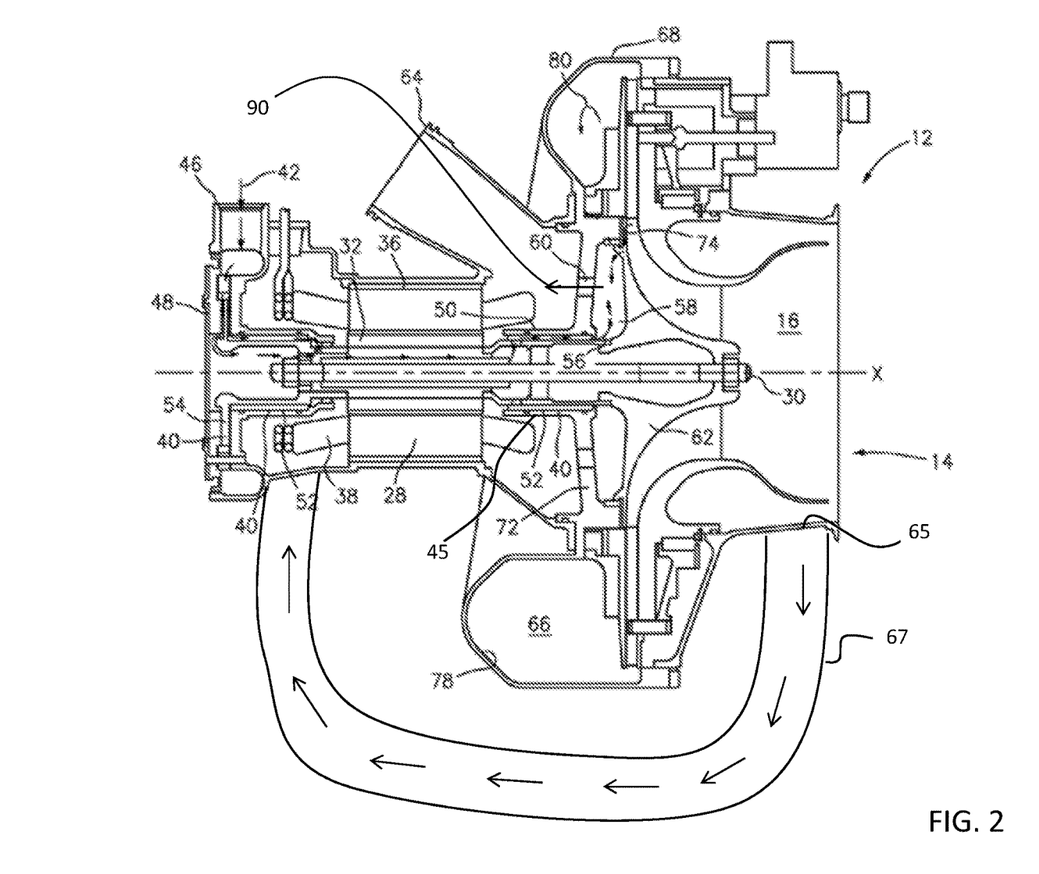
FIG. 2 is a cross-sectional view of a cabin air compressor assembly.

Referring now to FIGS. 1-2, a cross-sectional view of a cabin air compressor (CAC) 12 is illustrated in more detail. The CAC 12 compresses an air flow 14 received at a compressor inlet 16. The CAC motor 28 is an electric motor having a rotor 32 rotatably located at the CAC shaft 30 and a stator 36 having a plurality of stator windings 38 disposed radially outboard of the rotor 32. The CAC motor 28 also includes one or more bearings 40 disposed at the CAC shaft 30.

Figure 3:
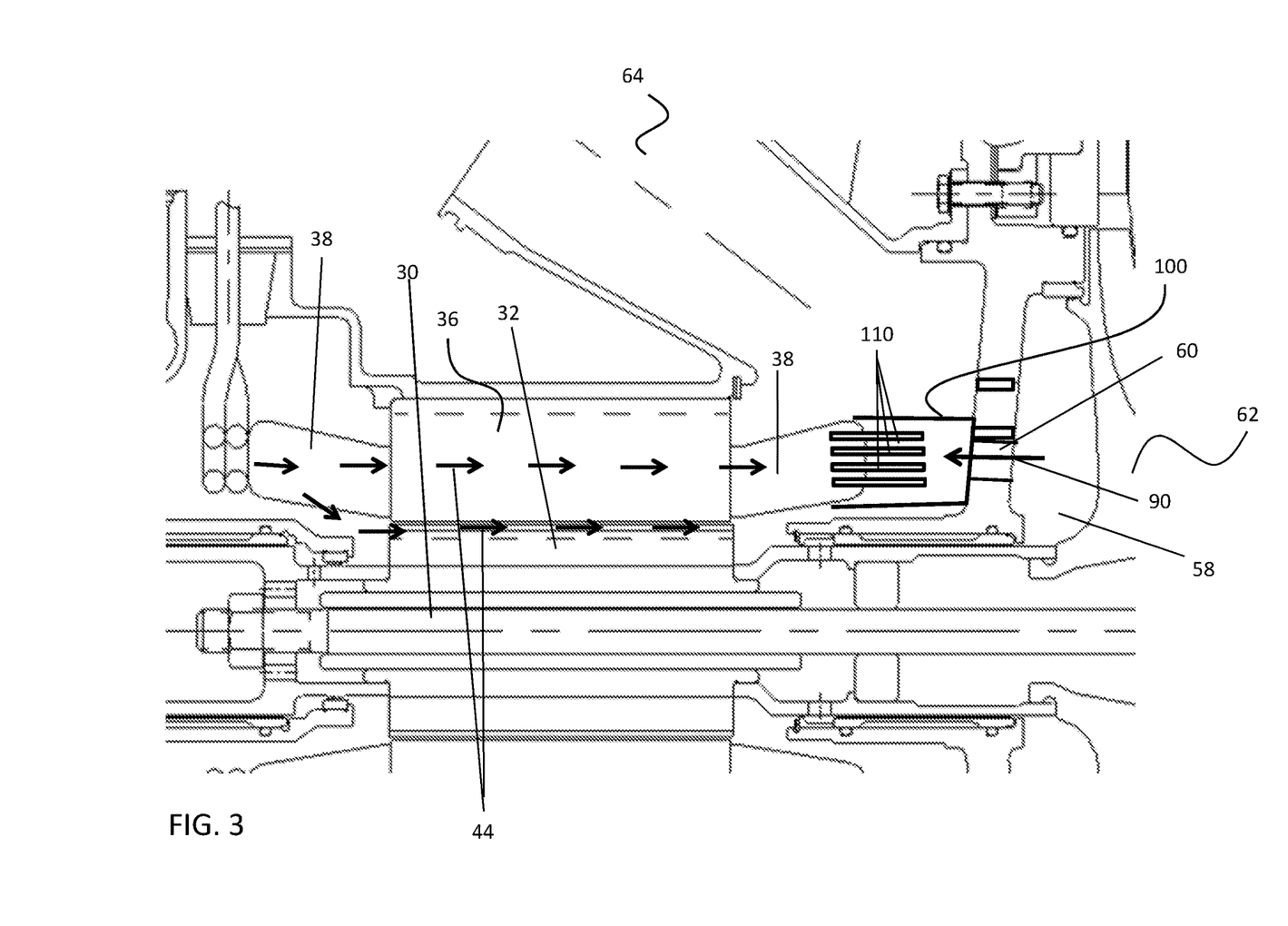
FIG. 3 is a cross-sectional view of a portion of the cabin air compressor assembly according to an embodiment of the invention.

To prevent overheating of the CAC motor 28, particularly of the stator windings 38 and the bearings 40, a cooling flow is drawn across the CAC motor 28. The cooling flow is driven generally by a pressure drop from the compressor inlet 16 to the heat exchanger 22 (FIG. 1). In some embodiments, as shown in FIG. 2-3, the cooling flow includes a bearing cooling flow 42, and a motor cooling flow 44, best shown in FIG. 3. The bearing cooling flow 42 is supplied via a bearing cooling inlet 46 at a first end 48 of the CAC motor 28, opposite a second end 50, at which the CAC 12 is disposed. The bearing cooling flow 42 proceeds across thrust bearings 54 located at the first end 48 and across journal bearings 52 located, for example, at the CAC shaft 30 at the first end 48 and/or the second end 50, thereby removing thermal energy from the bearings 40, 52, 54. The bearing cooling flow 42 exits at a bearing cooling flow exit 56. After passing through the exit 56, the bearing cooling flow 42 proceeds substantially radially outwardly into a mixing chamber 58.

The motor cooling flow 44 is drawn from the compressor inlet 16, enters at a motor inlet 65 and proceeds toward the first end 48 via a cooling conduit 67. The motor cooling flow splits into two portions travelling from a first end to a second end removing thermal energy from the stator windings and other components of the CAC motor 28. As shown, a first portion of the motor cooling flow 44 passes about the outer diameter of the stator 36 and the exposed stator windings 38, and a second portion of the motor cooling flow 44 proceeds through the gap formed between the rotor 32 and the stator 36. Adjacent the stator windings 38 arranged near the second end 50 of the motor 28, the motor cooling flow 44 is directed at an angle towards a cooling flow exit 64.

As shown, a compressor rotor 62 is operably connected to the CAC shaft 30 and rotates about an axis X driven by the CAC motor 28. The compressor rotor 62 compresses the air flow 14 to provide a compressed flow 80 in volute 66 of a cabin air compressor housing 68 and directed to a compressor outlet 78. A portion of the air flow 74 may leak into the mixing chamber 58 where the air is mixed with the bearing cooling flow 42. Cooling airflow holes 60 are sized and distributed at an interior portion of the cabin air compressor housing 68 between a journal bearing support 45 and the compressor volute 66 of the CAC housing 68. A cooling outlet flow 90 is urged from mixing chamber 58 through the cooling airflow holes 60.

Figure 4:
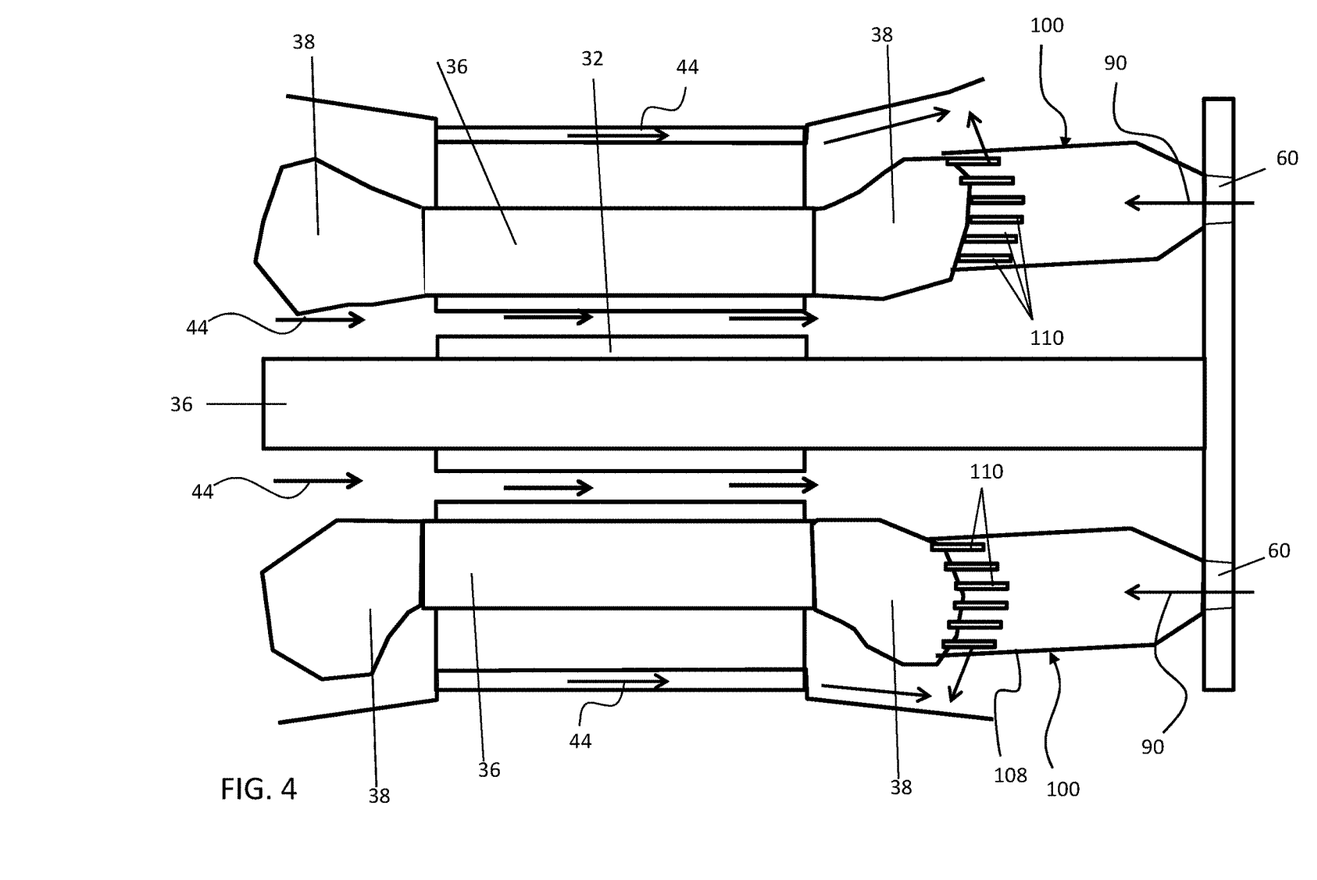
FIG. 4 is another cross-sectional view of a second end of the cabin air compressor motor according to an embodiment.
Figure 5:
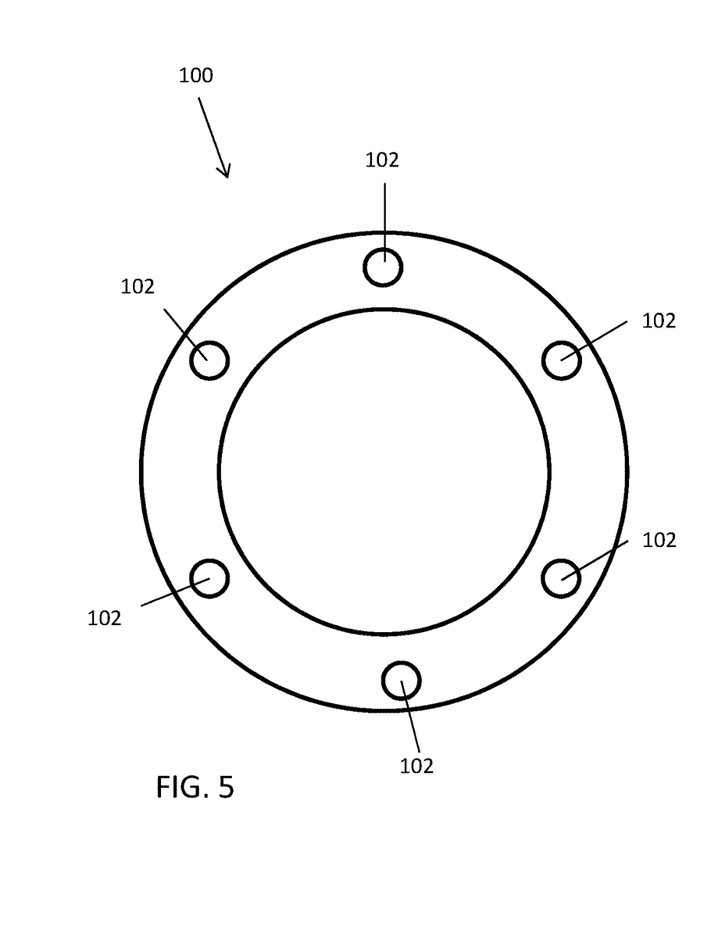
FIGS. 5 and 5a are front and side views of an annular duct for use with an end winding of a CAC motor according to an embodiment of the invention.
Figure 5A:
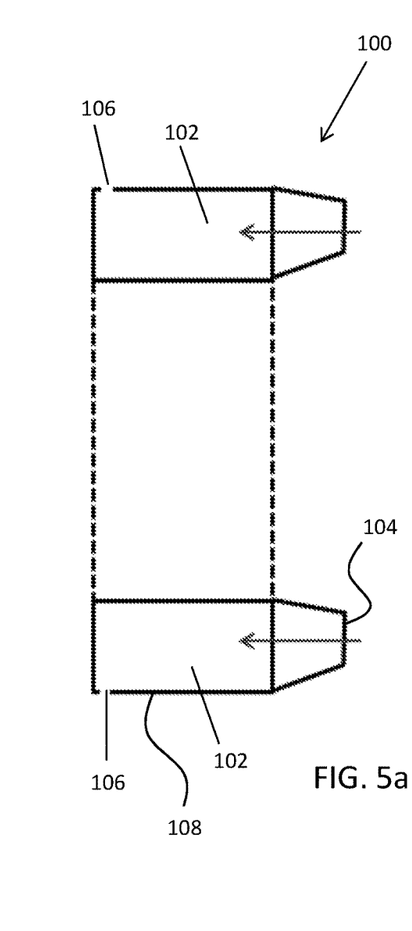

Referring now to FIGS. 3-5, an annular duct 100 extends between the downstream stator end winding 38 (near second end 50) and the interior wall 72 (FIG. 2) of the CAC housing 68 containing the cooling airflow holes 60. The duct 100 is arranged in fluid communication with the plurality of cooling airflow holes 60 such that the cooling outlet flow 90 from the mixing chamber 58 is directed towards the adjacent end winding 38. In one embodiment, the duct 100 includes a plurality of substantially hollow flow passages 102, each of which is aligned with one of the plurality of cooling airflow holes 60 to form a flow path for the cooling outlet flow 90. The duct 100 may have a substantially uniform cross-sectional area over its length, or alternatively, may vary in size, for example having a smaller cross-sectional area adjacent an inlet end 104. As best shown in FIG. 5a, one or more openings 106 are formed in an outer surface 108 of the duct 100 adjacent the end winding 38. The openings 106 provide an outlet through which the cooling outlet flow 90 may pass and mix with the motor cooling flow 44 before being directed towards the cooling flow exit 64. In this manner, the seal leakage air flow is used to cool the end winding 38 of the motor stator 36. In some operating conditions, the cooling flow rate from seal leakage is as much as the motor cooling air flow, so by directing that air flow over the end winding 38, an additional motor temperature reduction is obtained.

Figure 6:
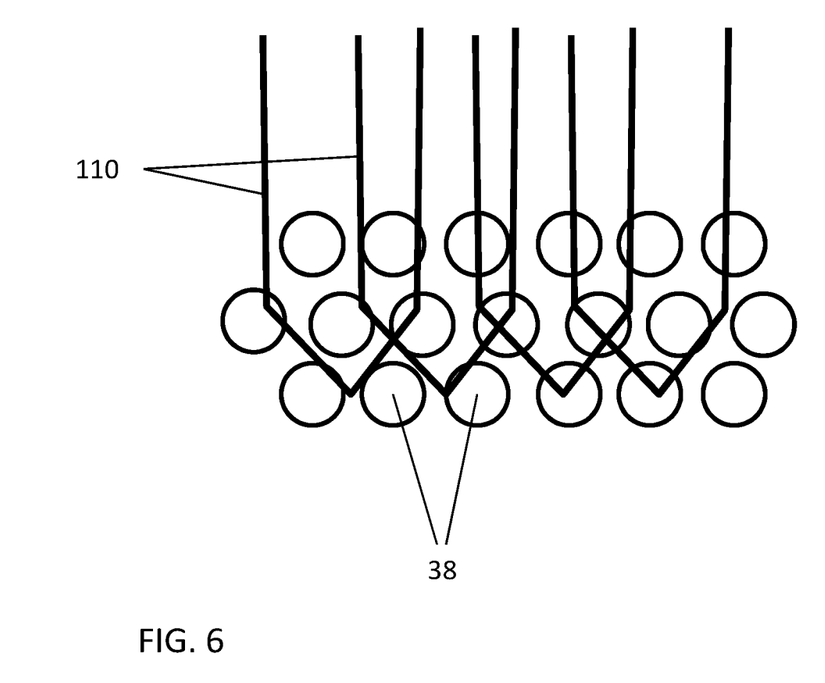
FIG. 6 is a schematic diagram of an arrangement of a heat transfer enhancement and an end winding of the CAC motor according to an embodiment.

In addition, the stator end winding 38 may include at least one heat transfer enhancement 110 configured to improve the heat transfer between the stator end winding 38 and the cooling outlet flow 90 within the duct 100. In one embodiment, the heat transfer enhancement 110 includes a plurality of heat transfer fins, such as pin fins for example. The fins 110 may be substantially identical, or alternatively, may be different to address various cooling needs at different positions of the end winding 38. Also, the fins 110 may be coupled to the end windings 38, or may be integrally formed with the end windings 38, such as by embedding the fins 110 within the turns of the end windings 38, as shown in FIG. 6. Although heat transfer fins 110 are illustrated and described herein, other types of heat transfer enhancements, such as a heat pipe or an alternate geometry of the turns of the end windings 38 are also within the scope of the disclosure. The type and configuration of the heat transfer enhancement 110 may be selected based on the application and a desired amount of heat to dissipate.

Inclusion of the duct 100 and at least one heat transfer enhancement 110 significantly reduces the temperature of motor stator 36 and end windings 38. This decreased temperature will result in an increased reliability of the CAC motor 28.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cabin air compressor assembly comprising:
a cabin air compressor including a compressor rotor;
a cabin air compressor motor operably connected to the cabin air compressor to drive rotation of the compressor rotor, the cabin air compressor motor including a motor rotor and a stator having a plurality of first end windings disposed at a first axial end of the stator and a plurality of second end windings disposed at a second axial end of the stator opposite the first axial end, the second axial end disposed closer to the cabin air compressor than the first axial end;
a cabin air compressor housing having the compressor rotor disposed therein and including a plurality of cooling airflow holes formed therein, the plurality of cooling airflow holes configured to direct a leakage airflow from the cabin air compressor therethrough to the second end windings at the second axial end of the stator;
a motor cooling flow movable across a portion of the cabin air compressor motor to cool the stator and the first end windings; and
a duct extending from the cabin air compressor housing to the second end windings to direct the leakage flow to the second end windings,
a cooling conduit extending from the cabin air compressor housing to the first end windings, the motor cooling flow directed across the first end windings in a first direction, and the leakage airflow directed across the second end windings in a second direction opposite the first direction, the cooling conduit including:
a cooling conduit inlet in the cabin air compressor housing upstream of the compressor rotor; and
a cooling conduit outlet at the first end windings, such that the motor cooling flow through the cooling conduit and across the first end windings bypasses the compressor rotor;
wherein the cooling airflow holes are sized and distributed at an interior portion of the cabin air compressor housing between a journal bearing support and a compressor volute of the cabin air compressor housing.

2. The cabin air compressor assembly according to claim 1, wherein the cooling outlet flow mixes with the motor cooling flow before being provided to a cooling flow exit.

3. The cabin air compressor assembly according to claim 1, wherein the cabin air compressor housing including a plurality of cooling airflow holes and the duct includes a plurality of flow passages formed therein such that each of the plurality of flow passages is substantially aligned with one of the plurality of cooling airflow holes.

4. The cabin air compressor assembly according to claim 1, wherein a cross-sectional area of the duct varies over a length of the duct.

5. The cabin air compressor assembly according to claim 1, wherein a cross-sectional area of the duct remains constant over a length of the duct.

6. The cabin air compressor assembly according to claim 1, further comprising at least one heat transfer enhancement mounted to the first end windings connected to the duct.

7. The cabin air compressor assembly according to claim 6, wherein the at least one heat transfer enhancement includes a plurality of fins.

8. The cabin air compressor assembly according to claim 6, wherein the plurality of fins is coupled to one or more end turns of the second end windings.

9. The cabin air compressor assembly according to claim 6, wherein the plurality of fins is embedded within one or more end turns of the second end windings.

10. The cabin air compressor assembly according to claim 1, wherein the cabin air compressor motor is configured to receive a power input of between 100 kW and 115 kW.

* * * * *